May 5, 1931.  A. M. ROSSMAN  1,803,508
CLAMP
Filed June 19, 1925  3 Sheets-Sheet 1
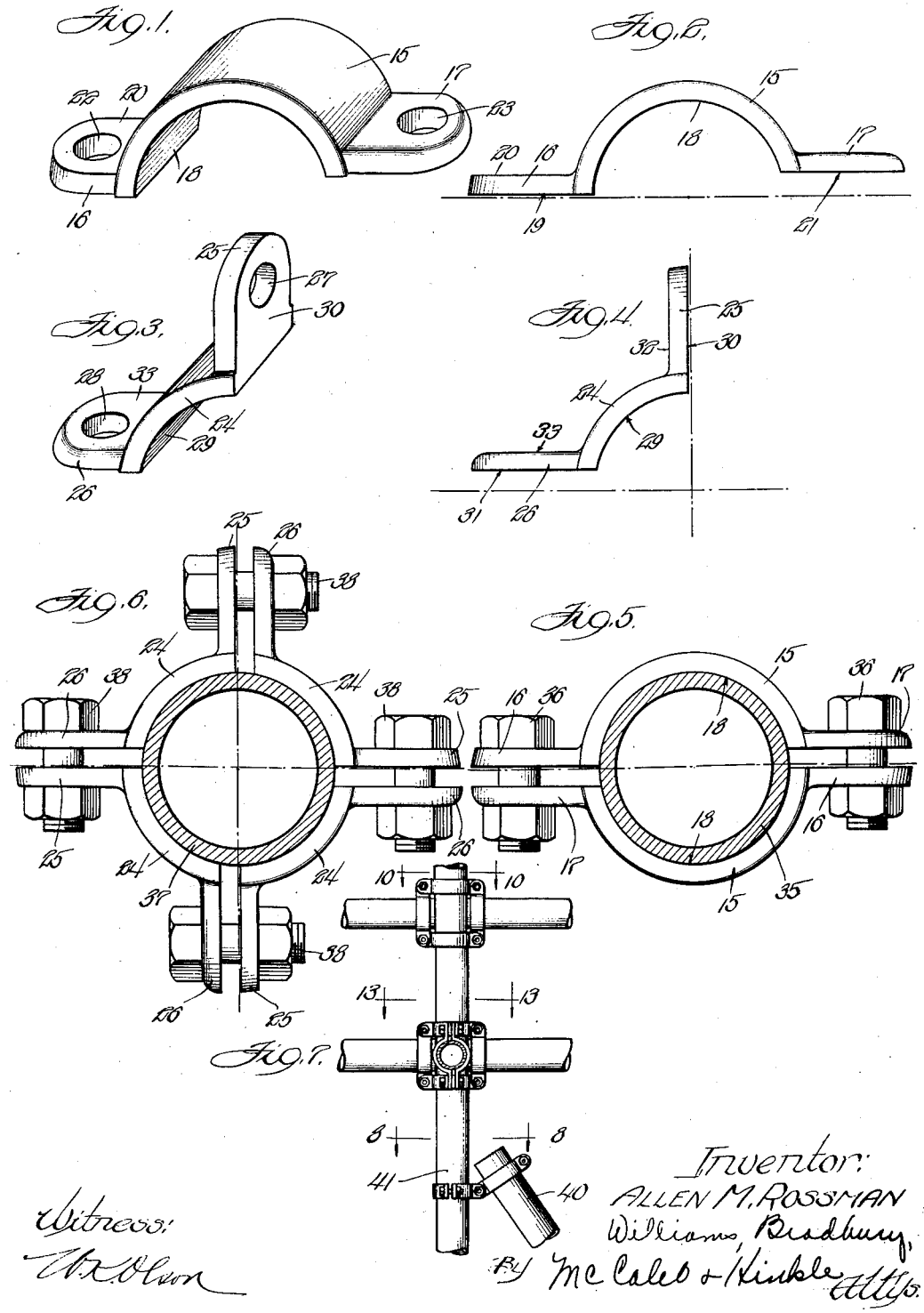

May 5, 1931.  A. M. ROSSMAN  1,803,508
CLAMP
Filed June 19, 1925  3 Sheets-Sheet 2
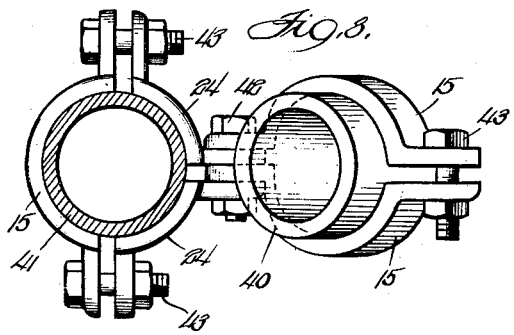
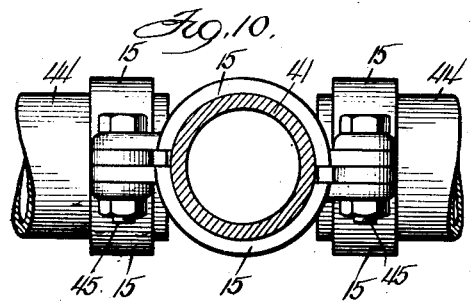
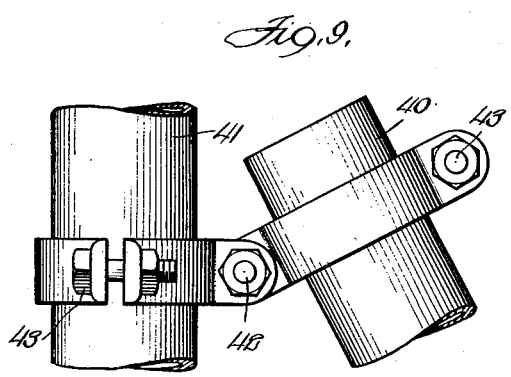
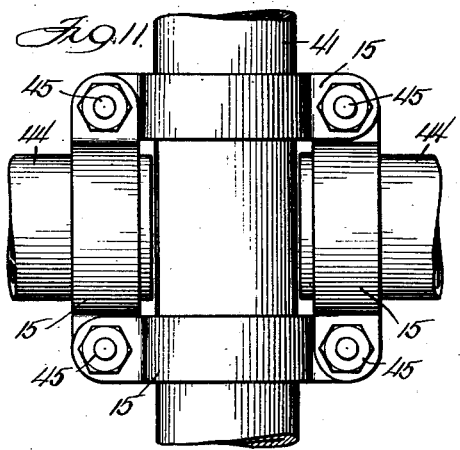
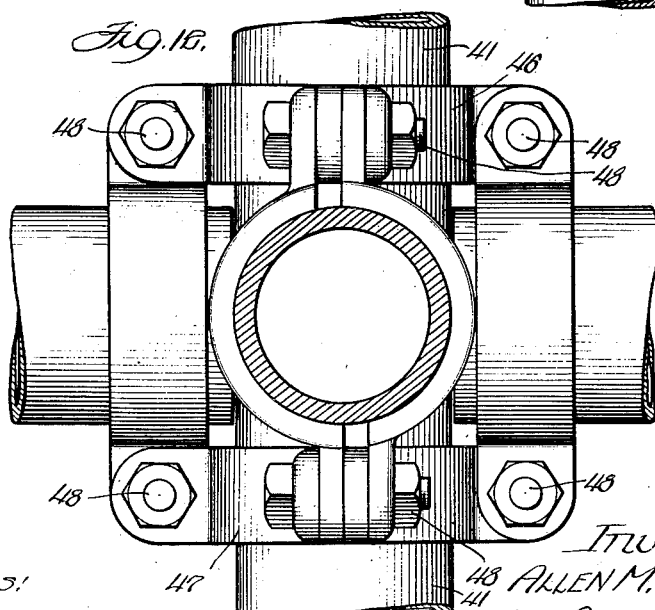
Inventor:
ALLEN M. ROSSMAN

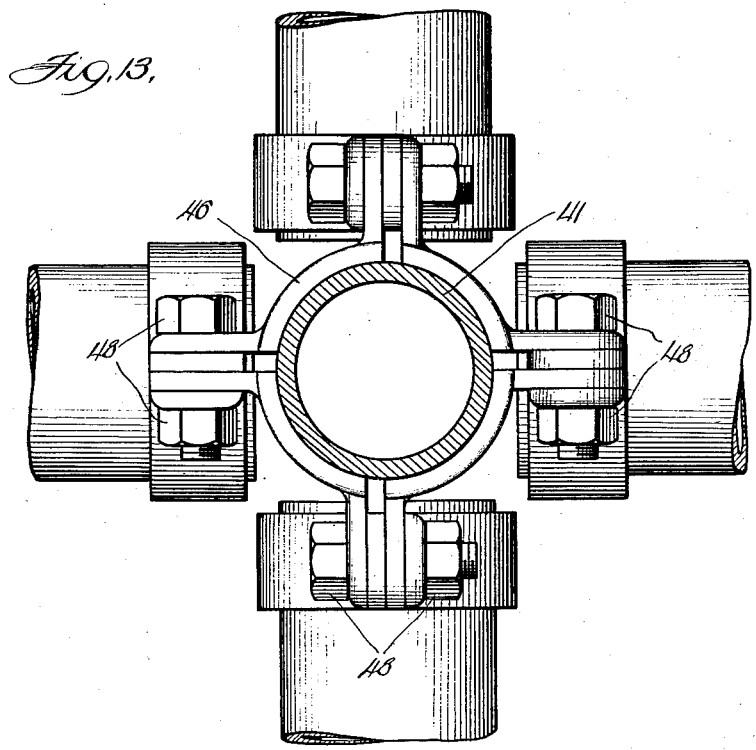

Patented May 5, 1931

1,803,508

UNITED STATES PATENT OFFICE

ALLEN M. ROSSMAN, OF CHICAGO, ILLINOIS, ASSIGNOR, BY MESNE ASSIGNMENTS, TO ROSSMAN PATENTS, INCORPORATED, OF CHICAGO, ILLINOIS, A CORPORATION OF ILLINOIS

CLAMP

Application filed June 19, 1925. Serial No. 38,286.

This invention relates to clamps.

It will be explained as embodied in a clamp particularly adapted to hold cylindrical rods or pipes together in various arrangements and combinations.

In the erection of many kinds of structures, such, for example, as switchboards, panel boards, scaffolds, and open work metal towers and frame works for supporting walls, machinery and appliances, it is the common practice to use cylindrical metal rods or pipes which are clamped together in such a manner as to produce the desired structure and to afford the requisite strength and rigidity thereof. It is often necessary or desirable to join together a considerable number of such pipes or rods at various angles.

It is now the usual practice for manufacturers of clamps used in the fabrication of such structures to provide a large number of different types of clamps, each type being especially adapted for some particular condition, as to the number of pipes it can accommodate and as to the angle at which the pipes are joined. This practice results in inconvenience and excessive expense, both to the manufacturer and to the user. The manufacturer must produce and stock and the user must keep on hand a large variety of clamps in order that the particular device required for any situation which may arise will be available. The necessary number and variety of the clamps causes confusion, loss of time and expense.

When my new and improved clamp is used it is only necessary to have a supply of two kinds of simple units and sufficient nuts and bolts to secure said units. These two kinds of units may be so assembled as to join a plurality of pipes having a various angular relationships and lying in several different planes.

One of the objects of this invention is to provide an improved clamp.

Another object is to provide a clamp which will overcome the objections to the present clamps heretofore mentioned.

Another object is to provide an improved clamp unit.

Another object is to provide two supplementary styles of clamp units which may be associated in a variety of ways to fabricate clamps for a wide range of use.

Another object is to provide clamp units which may be readily assembled in proper relation.

Another object is to provide complementary clamp units whose relation in various assemblies may be readily determined.

Another object is to provide clamp units which may be secured together in various combinations with a minimum number of bolts.

Another object is to provide clamp units which are simple, inexpensive, reliable and strong.

Other objects and advantages will hereinafter appear.

In general, the clamp units from which the various clamps may be fabricated comprise a half-clamp unit and a quarter-clamp unit. The half units are so named because two such units will, when properly assembled, form a substantially complete circular clamp section or collar. The quarter units are so named because four such units will form substantially a complete circular clamp section or collar. Of course, one half unit and two quarter units will also form a substantially complete circular clamp section or collar.

The adaptability of my invention is such that a single composite clamp can be assembled which will take care of all pipes whose axes intersect at a point common to all of said axes. This adaptability results from the gap formed between adjacent lugs of complementary members of a pair of units, which gap permits the introduction therebetween of a lug of a co-operating pair of complementary units with the resulting alternative arrangement of the lugs of the co-operating pairs as hereinafter clearly shown. The clamp may be made up in thirds as well as halves and/or quarters or within limits in any number of parts. In each case the individual units of which the complete encircling clamp is formed, may be identical.

Embodiments and illustrative applications of the invention are shown in the accompanying drawings, wherein Figure 1 is a perspective of a half-clamp unit;

Figure 2 is a side elevation thereof;

Figure 3 is a perspective of a quarter-clamp unit;

Figure 4 is a side elevation thereof;

Figure 5 shows two half units assembled to form a clamp section or encircling collar;

Figure 6 shows four quarter units assembled to form a clamp section or encircling collar;

Figure 7 is an elevation of a part of a typical frame work showing three different types of connections or joints between pipes;

Figure 8 is an enlarged section on the line 8—8 of Figure 7 showing an arrangement of units to form a single joint or two-way connection illustrated at the bottom thereof;

Figure 9 is a side elevation of the connection or joint shown in Figure 8;

Figure 10 is an enlarged section on the line 10—10 of Figure 7 showing an arrangement of units to form the four-way connection or joint illustrated at the top thereof;

Figure 11 is a side elevation of the connection shown in Figure 10;

Figure 12 is an enlarged side elevation of the six-way connection or joint shown at the middle of Figure 7; and Figure 13 is a section on the line 13—13 of Figure 7.

The half-unit shown in Figs. 1 and 2 comprises a curved body 15 and two outwardly projecting clamping lugs 16 and 17, one lug being at each end of body 15. Body 15 has an inner or pipe clamping face 18 which is curved on the arc of a circle having a diameter approximately the same as the external diameter of the pipe or rod with which it is to be used. Preferably, the thickness of body 15 and lugs 16 and 17 are about the same and sufficient to withstand the loads to which the unit will be subjected. Lug 16 has an inner or front clamping face 19 which is located approximately in the plane of a diameter of the body or pipe clamping face 18 and a rear or outer clamping face 20 substantially parallel thereto. Clamping face 19 preferably should fall slightly short of being in a plane of a diameter of curved face 18 so that the pipe or rod will be tightly clamped when the units are assembled. About $\frac{1}{32}$ of an inch has been found to give good results under ordinary conditions. Lug 17 has an inner or front clamping face 21 which is parallel to the plane of clamping face 19 and approximately in the same plane as the outer clamping face 20 of the opposite lug. In other words, the curve of body clamping face 18 falls short of being a complete semi-circle by approximately the thickness of one of the projecting clamping lugs. Clamping lugs 16 and 17 are provided with holes 22 and 23, respectively, for the receipt of assembly bolts, as will be hereinafter explained.

Now it is to be observed that the half clamp unit shown in Figs. 1 and 2 comprises a body part 15 with an inner or clamping face 18 which, for clamping a round rod or pipe, is cylindrical and the longitudinal axis of the cylindrical face 18 is substantially coincident with the longitudinal axis of the pipe or rod to be clamped, as illustrated in Fig. 5.

The ears 16 and 17 have bolt holes 22 and 23, the axes of which are, in this unit, parallel to each other and lie in substantially a common plane which is at right angles to the longitudinal axis of the clamping face 18. The axes of the bolt holes 22 and 23 lie equidistant from the longitudinal axis of the clamping face. In any form of unit they are thus equidistant from the longitudinal axis of the cylindrical clamping face and are disposed in the same plane at right angles to said longitudinal axis of the clamping face and may be considered as tangent to a common circle in said plane, which circle is concentric with the said axis of the clamping face.

The ears have front and back faces which, in the case of the shorter ear 16, should be substantially parallel planes. The front face 21 of the longer ear should be a substantially flat planar surface because of the desirability of engaging the flat planar surfaces of cooperating ears. The back side of the longer ear 17 is also preferably, but not necessarily, a flat planar surface parallel to the front surface 21, as it is engaged only by the bolt head in the preferred form of the clamp.

The face 19 of the ear 16 lies substantially in a plane passing through the longitudinal axis of the cylindrical clamping face 18. That is true in each case, whether the unit is a half, quarter, third or any other part. The face 21 lies in a plane parallel to a plane passing through the longitudinal axis of the curved face 18 and spaced from said latter plane by the thickness of the short ear 16. That relationship always prevails whether the unit be a quarter, third, half, or any other part. In the particular unit of Figs. 1 and 2, namely, in the half unit, this relationship means that the plane of the face 21 is substantially the same as the plane of the back face 20 of the ear 16, due to the fact that this is a special instance of the broader or more general relationship.

Due to the aforesaid general relationships, the axes of the bolt holes are normal to the inner clamping faces such as 19 and 20 in Figs. 1 and 2. These relationships are new and highly useful.

The ears or lugs are of such length and outline and the bolt holes so located that the ears or lugs of a pair of clamps for rigidly connecting two rods or pipes may freely swing or hinge on the common bolt to permit such two rods or pipes to be adjusted to substantially any angle in the plane in which they lie and then to be rigidly clamped in that position.

The means by which this capability is best secured is by forming the lugs or ears of the same width and of a length such that the axis of the bolt hole is spaced from the back of the curved body by a distance at least as great as one-half of the width of the ears. The outer margins of the ears are preferably formed substantially concentric with the bolt holes. Obviously, the lugs or ears could be longer than that required for the free hinging of the parts on the common bolt and the outline of the ends could then also be other than concentric, but with less economy of material and less strength. Thus, the lugs or ears are not only excellent clamping members when bolted together, but also excellent hinges for permitting facile angular adjustment before the bolt is drawn up.

Preferably, the body portion is of substantially the same width as the ears so that on hinging the two clamps may assume a position of substantially right angles to each other.

The quarter unit shown in Figures 3 and 4 comprises a curved body 24 and two right angularly related outwardly projecting clamping lugs 25 and 26. There is one clamping lug at each end of the curved body and they are provided with suitable bolt holes 27 and 28, respectively. The inner or pipe clamping face 29 of body 24 is curved on the arc of a circle whose diameter is approximately the same as the external diameter of the pipe or rod with which the unit is to be used, but it extends somewhat less than a quarter of the circle. The inner or pipe clamping face 30 of lug 25 is approximately in the plane of a radius of the curve of the pipe clamping face 29, preferably falling slightly short of a radius in order to insure a tight grip upon a pipe. As in the case of the half-unit about $\frac{1}{32}$ of an inch ordinarily will produce satisfactory results. The front or inner clamping face 31 of lug 26 is in a plane at right angles to the plane of clamping face 30 of lug 25, but is short of the right angularly related radius by approximately the thickness of the lug. In other words, the arc of the pipe clamping face of the quarter unit falls short of being a complete quarter circle by approximately the thickness of a lug. Lugs 25 and 26 have rear clamping faces 32 and 33, respectively.

The above recited general relations of the half clamp shown in Figs. 1 and 2 govern the quarter clamp shown in Figs. 3 and 4 and, in fact, cover any fractional unit from which the clamp is constructed.

In order that the pipe clamping faces of complementary units may secure a balanced or symmetrical clamping effect upon the pipe to be clamped when they are assembled to form clamp sections, it is necessary to place the opposite lugs of complementary units facing each other. In other words, the lug on the shorter side of one unit must be placed opposite the lug on the longer side of the complementary unit. To facilitate assembly, the units may be characteristically marked or formed so that their opposite ends may be readily and quickly recognized. One method of affording ready recognition of the two ends of a unit is to form one lug with rounded edges and the other lug with relatively square or sharp edges. Thus, in the clamps illustrated in the drawings, lugs 16 of the half units and lugs 25 of the quarter units are provided with squared or relatively sharp rear edges, while lugs 17 of the half units and lugs 26 of the quarter units are provided with well rounded rear edges. This difference in the form of the lugs provides an easily distinguishable characteristic whereby the workman can tell at a glance how the units should be assembled to fabricate any desired joint combination.

Figure 5 shows how two half-units 15 can be assembled to form a clamp section to completely encircle a cylindrical pipe or rod 35. The lug on the longer side of each unit is placed opposite the lug on the shorter side of the other or complementary unit. That is, the square or sharp-edged lug 16 of one unit is placed opposite the round-edged lug 17 of the other unit. Bolts 36 which pass through the aligned holes 22 and 23 in the unit lugs serve to anchor the units together and cause the clamp to bind upon and grip the pipe or rod.

Figure 6 similarly shows how four quarter-units 24 may be assembled to form a completely encircling clamp section about a pipe or rod 37. The units are assembled so that the square-edged lug 25 of each unit lies opposite or adjacent to the round edged lug 26 of the complementary unit. Bolts 38 which pass through the holes 27 and 28 in the unit lugs hold the units together and cause them to bind upon and grip the pipe or rod.

These two types of units provide for the easy fabrication of a large variety of clamps, a few typical examples of which will hereinafter be described.

With a simple outfit consisting of a supply of these two kinds of units and the necessary nuts and bolts, it is possible to securely clamp together pipes or rods lying in several different planes and having various angular relationships. In fact, the adaptability of my invention is such that a composite clamp can be made which will take care of and securely join all pipes or similar members whose axes intersect at a point common to all of them.

Figures 8 and 9 illustrate in detail an assembly and arrangement of units for fabricating a two-way clamp suitable for joining two pipes together at an angle as shown at the bottom of Figure 7. In the drawing a bracing pipe 40 is joined to a standard or upright pipe 41 in the same plane. To form one section of the complete clamp two half-units 15 have been used and to form the other section one half-unit and two quarter units 24 have been employed. The latter section could have been formed of four quarter-units if desired. The clamp on pipe 41 could be made of two halves instead of two quarters and a half, particularly if it were desired to make a connection to pipe 41 on the side opposite the pipe 40. Likewise, the half and two quarters may be differently disposed, or four quarters might be utilized, if desired, on pipe 41. The two sections of the clamp are joined by a bolt 42 which passes through the aligned holes in the overlapping lugs of the units. At the joint the lugs of the units of one clamp section alternate with the lugs of the units of the other clamp section. The other sets of adjacent lugs are clamped together by bolts 43. At the joint between the two clamp sections the units which form each section,—that is, the units which form each encircling collar—have their round-edged lugs adjacent their square-edged lugs and separated by a lug of the unit of the other section as previously described. Thus the two outside lugs may have round outer edges and the two inner lugs have square edges giving the joint formed thereby a neat and finished appearance as clearly illustrated in the drawing.

Figures 10 and 11 illustrate an arrangement and assembly of units to form a four-way clamp suitable for joining two pipe sections 44 to the upright 41 as shown at the top of Figure 7. This clamp is shown as fabricated entirely from half-units 15. The adjacent or angularly related sections of the clamp are held together by bolts 45 which pass through the aligned holes of their overlapped unit lugs. At the corner or joints between sections the lugs on the units of adjacent sections alternate or overlap each other, as most clearly shown in Figure 10. Thus round edged lugs lie at the outside of each joint and the square edged lugs lie together on the inside, giving the finished appearance heretofore mentioned and clearly shown in the drawings.

Although Figures 10 and 11 illustrate two pipes united at right angles to a pipe which passes entirely through the clamp, it will be understood that the same clamp might be used to unite four pipes each of which ends at the clamp.

Figures 12 and 13 show an arrangement and assembly of units to form a six-way clamp, suitable for uniting four pipes to the upright 41, as shown at the center of Figure 7 or for joining six pipes if all end at the clamp. In fabricating a clamp of this type quarter-units are used to form two of the opposite sections, for example, upper section 46 and lower section 47, in order to accommodate the lugs forming the four sections which lie at right angles thereto. The other units, however, may be half-units. At each corner of the clamp the lugs of the angularly related section units overlap as previously described, the same being secured together by bolts 48.

A complete clamp for a rod or pipe may consist within limits of any desired number of unit parts as two, three, four, etc. In each case, the body portions leave gaps on the surface of the pipe corresponding to the number of units employed and the thickness of an ear. Thus, for a two part clamp, the space on the surface of the pipe not occupied by the curved clamping faces is equal to twice the thickness of an ear. In the case of four quarters, the unoccupied space is equal to four times the thickness of an ear. For a three part clamp either three equal unit pieces or two quarters and a half the unoccupied space is equal to three times the thickness of an ear. This permits of the insertion of a like number of ears in clamping relation to the encircling clamp on the particular pipe. This is a new relationship not heretofore practiced, and of marked utility.

I claim:

1. A structural clamp for joining pipes and the like together at an angle and comprising angularly related clamp sections one for encircling each pipe, each clamp section comprising complementary curved units which have lugs projecting from opposite ends, the lugs of the units of one section alternately overlapping the lugs of the units of an angularly related section; and a bolt or the like passing through the overlapping lugs to hold the clamp sections together.

2. A structural clamp of the class described for joining together rod-like members, comprising a plurality of clamp sections each of which embraces and grips a rod-like member, each clamp section including a plurality of clamp units each of which has a body embracing a part of the perimeter of a rod-like member, a lug carried by said body part and having a front face lying approximately in a plane of a radius of the arc corresponding to said part of the perimeter, and a second lug on said body part having a front face parallel to and spaced from a plane of a second radius of said arc by a distance approximately equal to the thickness of a lug, adjacent lugs of adjacent units spaced from each other approximately the thickness of a lug, and bolt-like means for securing said units in gripping relationship to said members and connecting said clamp sections with the lugs of a clamp section intermeshing with the adjacent lugs of a connected clamp section.

3. A structural clamp of the class described including a clamp section adapted to embrace a rod-like member and comprising two identical clamp units; each unit having a body provided with an arcuate clamping face, a lug projecting outwardly from one end of said body and having a front face approximately in the plane of a radius of the body clamping face, and a second lug projecting outwardly from the other end of said body and having a front face parallel to a radius of the body clamping face and offset therefrom by substantially the thickness of a lug, the adjacent lugs at one end of the two assembled clamp units providing a space therebetween capable of receiving a lug of another clamp unit; and means for securing said units together.

4. In combination, a pair of rigid split band clamps for fixedly clamping two rods in the same plane, said clamps having longitudinal axes adapted to coincide substantially with the longitudinal axes of the rods, said longitudinal axes of the clamps lying in a common plane and the clamps being adjustable with respect to each other to clamp the rods at any desired angle in said common plane, the clamps comprising split band units having ears at opposite ends, two pairs of ears of the clamps having two pairs of parallel clamping faces lying in planes parallel to the plane of said two rods and one pair of clamping faces lying in the plane of said two rods, and a common clamping bolt passing through them for holding the said two pairs of ears in firm frictional engagement and causing the clamps to grip the rods.

5. As an article of manufacture, a clamp member having a body portion with a concave face for engaging and gripping a cylindrical rod and having ears at each end of the body portion, said concave face having an axis adapted to coincide substantially with the longitudinal axis of the rod to be clamped, said ears having holes therein for receiving clamping bolts, the axes of said holes lying substantially in a plane at right angles to the axis of the concave gripping face and being substantially tangent to a circle in said plane concentric with the axis of said face, said ears having substantially flat front surfaces extending from said concave face and substantially lying in separate planes, one of which passes substantially through said axis of the concave face, the other plane being parallel to and spaced from a plane passing through the axis of the concave face by a distance which is substantially the thickness of one of said ears.

6. As an article of manufacture, a clamp member having a body portion with a concave face of the form of a right cylinder for gripping a round rod, and having ears at each end of the body portion, said ears being of substantially the same width, each ear having a front and a back face substantially parallel to each other, said concave face having an axis adapted to coincide substantially with the longitudinal axis of the rod to be clamped, each ear having a bolt hole, the axis of which is substantially normal to its front face, the axis of said bolt holes lying in substantially a common plane which is normal to the aforesaid axis of the cylindrical face and said bolt hole axes being substantially tangent to a circle in said common plane concentric with the aforesaid axis of the cylindrical face, the axis of the bolt hole in each ear being spaced from the back of the body portion by a distance at least as great as one-half the width of an ear, the plane of the inner face of one ear passing through said axis of the concave face, the plane of the inner face of the other ear being parallel to a plane passing through the aforesaid axis of the concave face and spaced from said latter plane a distance equal to the thickness of one of said ears.

7. A multipart clamp comprising a plurality of sections, each section having a body portion and two ears, the ears being connected together in pairs, each body portion having a concave face fitting and adapted to clamp a rod, the concave faces having a common longitudinal axis which is substantially coincident with the longitudinal axis of a rod to be clamped, one ear of each pair having an inner face lying substantially in a plane passing through the common axis of the concave faces, the other ear of each pair having an inner face lying substantially in a plane parallel to the plane of the companion ear, but spaced therefrom by the thickness of an ear.

8. As an article of manufacture, a rigid clamp member having a body portion provided with a cylindrical clamping face, said face having a longitudinal axis adapted to substantially coincide with the axis of a rod to be clamped, an ear at each end of the body portion said ears being of substantially the same width, each ear having a front face on the side of the clamping face, and a back face on the opposite side, said front face and back face of each ear lying substantially in parallel planes the length of the back face of each ear being at least as great as the width of said back face, and the ears being of substantially equal thickness, said ears having bolt holes, the axes of which holes are substantially equi-distant from the said axis of the clamping face and spaced from the back of the body by a distance substantially equal to one-half of the width of the ear, the plane of the inner face of one ear substantially passing through said longitudinal axis of the clamping face, and the plane of the inner face of the other ear lying parallel to a plane passing through the said longitudinal axis but spaced therefrom by the thickness of an ear, said ears being of substantially the same outline and having the outer margins substantially coaxial with the corresponding bolt holes to permit free hinging of the ears of different clamp members on the axis of aligned bolt holes.

9. As an article of manufacture, a clamp member having a body portion provided with a concave cylindrical clamping face, said face having a longitudinal axis adapted to substantially coincide with the longitudinal axis of a rod to be clamped, an ear at each end of the body portion, each ear having a front face on the concave side of the body portion and a back face, the front face of one ear lying substantially in a plane passing through the said axis of the clamping face, the back face of said ear and the front face of said other ear lying substantially in a single plane substantially parallel to the first named plane, said ears being of substantially the same thickness and having bolt holes, the axes of which holes are substantially equi-distant from the said axis of the clamping face.

10. A multipart clamp for clamping a substantially cylindrical rod comprising a plurality of rigid members having a common longitudinal axis adapted to substantially coincide with the longitudinal axis of the rod to be clamped, said members comprising each a curved body portion and outwardly extending ears, said ears of all the members being of substantially the same thickness, and each ear having a front face and a back face lying in substantially parallel planes, there being bolt holes in the ears, the axes of the bolt holes lying in substantially a common plane and being substantially equidistant from the said common longitudinal axis, the adjacent faces of each pair of ears being spaced from each other by the thickness of an ear and one of said adjacent faces of each pair lying in substantially a plane passing through the said common longitudinal axis.

11. A multipart clamp for clamping a substantially cylindrical rod or pipe comprising a plurality of rigid clamp members having substantially a common longitudinal axis adapted to coincide substantially with the longitudinal axis of the rod to be clamped, said members comprising each a curved body portion having a cylindrical rod clamping face and having outwardly extending ears having front faces and back faces, said ears having bolt holes, the axes of which lie in substantially a common plane at right angles to the longitudinal axis of the clamp, and said axes of the bolt holes being equidistant from the said longitudinal axis, the curved body portions leaving unoccupied a space on the cylindrical surface of the rod equal to the thickness of a number of ears, which number is the same as the number of clamp members, one ear of each cooperating pair having its front face lying substantially in a plane passing through the axis of the rod to be clamped.

12. A multipart clamp for clamping a substantially cylindrical rod or pipe comprising a plurality of rigid clamp members having substantially a common longitudinal axis adapted to coincide substantially with the longitudinal axis of the rod to be clamped, said members comprising each a curved body portion having a cylindrical rod clamping face and having outwardly extending ears of a free length at least as great as their width, said ears all having substantially flat front and back clamping faces adapted to be engaged by flat clamping faces of the ears of a cooperating clamp, said ears having bolt holes, the axes of which lie in substantially a common plane at right angles to the longitudinal axis of the clamp, and said axes of the bolt holes being equidistant from the said longitudinal axis, the curved body portions leaving unoccupied a space on the cylindrical surface of the rod equal to the thickness of a number of ears, which number is the same as the number of clamp members, one ear of each cooperating pair of ears having a front face disposed substantially in a plane passing through the common longitudinal axis.

In witness whereof, I hereunto subscribe my name this 8th day of June, 1925.

ALLEN M. ROSSMAN.